United States Patent [19]

Turpin, Jr.

[11] 4,313,763
[45] Feb. 2, 1982

[54] CEMENT COMPOSITIONS CONTAINING SELF-SETTING POZZOLANS

[76] Inventor: Raymond C. Turpin, Jr., 3825 Wieuca Ter., NW., Atlanta, Ga. 30342

[21] Appl. No.: 201,725

[22] Filed: Oct. 29, 1980

Related U.S. Application Data

[63] Continuation-in-part of Ser. No. 120,838, Feb. 12, 1980, Pat. No. 4,256,500, which is a continuation of Ser. No. 899,699, Apr. 24, 1978, abandoned, which is a continuation-in-part of Ser. No. 823,321, Aug. 11, 1977, abandoned, which is a continuation-in-part of Ser. No. 721,050, Sep. 7, 1976, abandoned.

[51] Int. Cl.$^3$ ............................................. C04B 7/02
[52] U.S. Cl. ............................ 106/88; 106/90; 106/97; 106/98; 106/DIG. 1
[58] Field of Search .................... 106/86–88, 106/90, 97, 98, 314, 315, DIG. 1

[56] References Cited

U.S. PATENT DOCUMENTS

| | | | |
|---|---|---|---|
| 2,752,261 | 6/1956 | Dournaud | 106/117 |
| 2,785,988 | 3/1957 | Lipkind et al. | 106/109 |
| 3,663,287 | 5/1972 | Mizunuma et al. | 106/86 |
| 3,765,920 | 10/1973 | Humphrey | 106/288 B |
| 3,827,895 | 8/1974 | Copeland | 106/99 |
| 3,832,196 | 8/1974 | Broussard | 106/89 |
| 3,854,968 | 12/1974 | Minnick et al. | 106/109 |
| 3,856,541 | 12/1974 | Martin | 106/90 |
| 3,870,535 | 3/1975 | Minnick et al. | 106/118 |
| 4,047,567 | 9/1977 | Childs et al. | 106/90 |
| 4,120,736 | 10/1978 | Childs et al. | 106/90 |
| 4,204,875 | 5/1980 | Szalavitz | 106/88 |
| 4,210,457 | 7/1980 | Dodson et al. | 106/97 |
| 4,210,619 | 7/1980 | Haley | 106/315 |

*Primary Examiner*—James Poer
*Attorney, Agent, or Firm*—Donald M. MacKay; Oscar B. Brumback

[57] ABSTRACT

A cement composition comprising cement, a self-setting pozzolan material, fine aggregate, air, water, at least one alkali metal constituent selected from the group consisting of sodium, potassium, and lithium ions, and at least one anionic constituent which is soluble in water and forms a calcium salt which is also water soluble, and a water soluble oxide of boron compound wherein the alkali metal constituent is present in an amount up to approximately 4.0 percent by weight, in terms of the equivalent weight of sodium ions, of the pozzolan material, the anionic constituent is present in an amount up to approximately 6.0 percent by weight, in terms of the equivalent weight of chloride ions, of the pozzolan material; the water soluble oxide of boron compound is present in the range of about 0.01 to 2.0 percent, in terms of the equivalent weight of borate ions ($BO_3^{\equiv}$), by weight of the pozzolan material; the pozzolan material being self-setting; and the cement composition is further characterized by: (a) having a solid volume ratio of cement to the pozzolan material within the range of approximately 0.05 to 2.0; (b) having a ratio of the volume of paste (pozzolan, cement, air and water) to the solid volume of sand within the range of approximately 0.75 to 2.5; and (c) having a ratio of the solid volume of cement to the volume of mortar less than about 0.19.

49 Claims, No Drawings

CEMENT COMPOSITIONS CONTAINING SELF-SETTING POZZOLANS

REFERENCE TO RELATED APPLICATIONS

This application is a continuation-in-part of application Ser. No. 120,838 filed Feb. 12, 1980, U.S. Pat. No. 4,256,500, which in turn is a continuation of application Ser. No. 899,699, filed Apr. 24, 1978 and now abandoned, which in turn is a continuation-in-part of application Ser. No. 823,321, filed Aug. 11, 1977 and now abandoned, which in turn is a continuation-in-part of application Ser. No. 721,050, filed Sept. 7, 1976 and now abandoned.

BACKGROUND

The present invention relates to cement compositions utilizing a pozzolan material, preferably fly ash. One of the principal advantages of the present invention is that it provides cement compositions which are significantly cheaper per unit volume than conventional cement compositions having essentially the same structural properties while at the same time increasing the early compressive strength relative to standard commercial construction concretes. This result is achieved through proper proportioning of the various ingredients in the cement composition and the substitution of relatively large amounts of inexpensive pozzolan material for the more expensive cementitious ingredients normally utilized.

It has been known for many years that various finely divided, siliceous materials react with lime in the presence of moisture to produce cementitious materials. These silicious materials, known as pozzolans, occur naturally or are by-products of various manufacturing processes. Examples of pozzolan materials include blast furnace slag, volcanic ash, calcined shale, trass, pumice, diatomaceous earth, silicious clays, and fly ash, which is the fine, solid by-product contained in the gases from the combustion of pulverized coal. With the advent of increasing public environmental concerns and the resulting limitations imposed on gaseous and particulate emissions from such combustion reactions, increasingly large amounts of fly ash are being recovered from the stack gases of commercial coal burning facilities, particularly high efficiency electric power generating plants. Despite the resulting availability of considerable quantities of fly ash, at present there is no major commercial use for fly ash.

Fly ash, as well as other pozzolan materials, have been utilized to replace a portion of the more expensive cementitious ingredients conventionally utilized in various cement compositions, but full utilization of fly ash has not been achieved. The primary obstacle to the use of larger proportions of fly ash in these cement compositions is that the reaction of pozzolan materials, including fly ash, with lime is slow compared to the normal cement reaction. Thus, pozzolan containing cement compositions have an early compressive strength (typically measured at seven or twenty-eight days) which is significantly less than similar cement compositions based on conventional cementitious materials, such as Portland cement. If pozzolan is substituted for too large a proportion of the cement, the resulting cement composition will have a poor initial strength and will require additional time prior to imposition of the service load. It may be necessary to provide external support for the cement composition until the pozzolanic reaction has proceeded sufficiently so that the cement composition is self-supporting.

The slow curing time of cement compositions having a high proportion of pozzolan material is unacceptable or undesirable for most commercial applications. Attempts have been made to solve this problem by utilizing heat to accelerate the curing rate and by adding large amounts of excess lime and/or various chemicals. These techniques have produced various specialized products, but have have not accelerated the pozzolanic reaction sufficiently to be useful in preparing cement compositions suitable for a broad range of structural applications.

SUMMARY OF THE INVENTION

The present invention concerns cement compositions which realize the economc benefits of using larger amounts of pozzolan material. This result is achieved by properly proportioning the ingredients in the cement composition and by including in the composition certain alkali metal ions and, in addition, anionic constituents. By utilizing the appropriate amounts of cement, pozzolan, water, and fine aggregate, it is possible to minimize the void content of the cement composition and thereby insure maximum compressive strength. The addition of relatively large amounts of sodium, potassium, and/or lithium ions apparently accelerates the pozzolanic reaction and makes it possible to add the larger amounts of pozzolan material, in the proper proportion to the other ingredients of the cement composition, without incurring a concomitant loss in early compressive strength.

Because these benefits can be achieved when the requisite alkali metal ions and anions are provided in the form of sodium chloride, the present invention has the further significant advantage that the cement compositions can be prepared from sea water or other brackish waters. Prior to the present invention it was generally believed that the incorporation of sea water in cement compositions would be deleterious to the product. The present invention now makes it possible to prepare relatively inexpensive cement compositions with sea water, an advantage which is particularly useful in localities where sea water is more readily available than fresh water.

The cement compositions of the present invention comprise cement, a pozzolan material, fine aggregate, air, water, at least one alkali metal constituent selected from the group consisting of sodium, potassium, and lithium ions, and at least one anionic constituent which is soluble in water and forms a calcium salt which is also water soluble, and a water soluble oxide of boron compound; wherein the alkali metal constituent is present in an amount up to approximately 4.0 percent by weight, in terms of the equivalent weight of sodium ions, of the pozzolan material; the anionic constituent is present in an amount up to approximately 6.0 percent by weight, in terms of the equivalent weight of chloride ions, of the pozzolan material; the water soluble oxide of boron compound is present in the range of about 0.01 to 2.0 percent, in terms of the equivalent weight of borate ions ($BO_3^=$), by weight of the pozzolan material; the pozzolan material being self-setting; and the cement composition is further characterized by:

(a) having a solid volume ratio of cement to the pozzolan material within the range of approximately 0.05 to 2.0;

(b) having a ratio of the volume of paste (pozzolan, cement, air, and water) to the solid volume of sand within the range of approximately 0.75 to 2.5; and (c) having a ratio of the solid volume of cement to the volume of mortar less than about 0.19.

Further objects of the present invention will be apparent from the detailed description of the invention which follows.

DETAILED DESCRIPTION OF THE INVENTION

The present invention relates to cement compositions of all types in which Portland cement or similar cementitious material reacts with water to bind together various inert ingredients, including fine and coarse aggregates such as sand, stone, crushed rock, etc. As used herein the term "cement composition" refers to all such cementitious mixtures including, for example, those generally designated in the art as mortar, grout, and concrete. The present invention is applicable, but not limited, to the following types of cement compositions: ready mixed cement compositions, prefabricated concrete structural elements prepared by autoclaving or steam curing cement compositions, concrete compositions utilized in large mass structures, such as gravity dams, and concrete compositions employed as highway bases and surfaces. These cement compositions may be employed with additional reinforcing elements conventionally utilized in the art to supplement their structural properties.

Despite the inherent economic advantages associated with the substitution of pozzolan materials, such as fly ash, typical pozzolan cement compositions, such as concrete, presently used in commercial practice contain enough pozzolan material to replace only about 20 to 30 percent by weight of the cement normally present. (If fly ash is substituted for 30 percent of the cement, the cement:fly ratio, as hereinafter defined, is approximately 2.24.) Attempts to substitute larger amounts of pozzolan material for cement have resulted in cement compositions having an unacceptably poor early strength characteristics. As a result costly delays are encountered before the cement composition can bear a service load. Prior to the present invention attempts to realize the economic advantages associated with the utilization of large amounts of pozzolan material in cement compositions have been unsuccessful largely because of the undesirable properties of the resulting products.

The present invention is applicable to cement compositions containing one or more self-setting pozzolans and cement, in relative proportions such that the cement:pozzolan ratio is within the range of approximately 0.05 to 2.0. Preferably, the cement:pozzolan ratio is within the range of approximately 0.1 to 2.0. For present purposes the "cement:pozzolan ratio" means the ratio of the solid volume of dry cement to the solid volume of dry pozzolan material contained in the cement composition. As used herein the term "solid volume" (particularly as applied to the proportions of cement, pozzolan material, and sand or other fine aggregate) means the volume of the solid constituent exclusive of its voids and is determined by dividing the weight of the material by its specific gravity.

The cement compositions of the present invention include cement, self-setting pozzolan, sand or other fine aggregate, water, and entrained and entrapped air, which enters the cement composition during mixing of these ingredients. The cement constituents which may be utilized include any of the typical Portland cements known in the art, such as those meeting the description of ASTM Standard C 150-74, Types I, Ia, II, IIa and III. However, the proportion of cement contained in the present cement compositions is considerably less than that normally utilized in conventional cement compositions having comparable structural properties.

The pozzolan materials which may be utilized include any of the materials which are pozzolanic and which exhibit self-setting characteristics when subjected to the slump and resistance tests hereinafter described. Fly ashes, resulting from the combustion of various coals, are the preferred pozzolan material, because they are readily available, inexpensive, and have certain desirable physical properties. The shape and size distribution of fly ash particles in general improve the workability of cement compositions, and acceptable workability of such compositions containing fly ash can generally be achieved with less water than with other pozzolan materials. This reduction in the water requirement aids in minimizing the void content of the cement composition and increases the compressive strength of the cement compositions.

The cement compositions also include sand and/or other fine aggregates which may be any of those conventionally used in the art for preparing mortar or concrete. Suitable sands include those which are deficient in material passing through a No. 50 mesh screen. The amount of sand incorporated in the cement composition is determined by the volume of the cement composition and the strength properties which are desired, taking into account that the paste:sand ratio, as defined herein, must be kept within the defined range.

The cement composition also includes sufficient water to comply with ASTM and ACI standards for workability. Within these parameters it is desirable to minimize the quantity of water added to maximize the strength of the cement composition.

During the curing and hardening of the cement composition air and water leave voids which cause weakness in the cured product. To maximize the early compressive strength properties of the present cement compositions it is desirable to minimize the voids in the cement composition, since an inverse relationship exists between the volume of such voids and the compressive strength of the cement composition. It has now been found that these voids are minimized, if enough self-setting pozzolan material is added to a mixture comprising cement, sand, water, and air so that the volume ratio of paste (cement, pozzolan, water, and air) to sand (fine aggregate) is in the range of approximately 0.75 to 2.5 and, preferably, in the range of approximately 1.0 to 2.0. For present purposes the "paste:sand ratio" means the ratio of the volume of the paste constituents (cement, pozzolan, water, and air) to the solid volume of dry sand (fine aggregate). Although the optimum paste:sand ratio for any specific cement composition depends on the type of sand and cementitious ingredients utilized, the optimum amount will fall within the foregoing range.

The early compressive strength is also increased by accelerating the pozzolanic reaction, i.e., the reaction between calcium hydroxide, which is formed during hydration of the normal cementitious components, with the silicates present in the pozzolan material, to form additional calcium silicate. The rate of hydration of the cement controls the rate of formation of additional calcium hydroxide which is needed for the pozzolanic reaction to go to completion. Thus, the faster the cement hydrates, the faster significant quantities of calcium hydroxide become available, and the faster the pozzolanic reaction commences and is carried through to completion. Also, the rate at which the silica, within the pozzolanic material, is dissolved into the reaction medium, directly affects the amount of silica available at a given time to react with the available calcium hydroxide.

For purposes of the present invention an anion and its calcium salt are considered water soluble if they have a solubility approximately equal to the water solubility of calcium hydroxide and preferably in excess thereof.

Examples of anions which are useful in the present invention are chloride, bromide, nitrite, thiocyanate, cyanide, and lactate ions. One or more of the anions in this group may be employed in the cement compositions of the present invention. It has been noted that any measurable amount of these anions will have some identifiable effect on the pozzolanic reaction rate and the early compressive strength of the cement composition. The cement compositions may contain sufficient chloride ions to constitute up to approximately 6.0 percent by weight of the pozzolan material present and, preferably, from approximately 0.1 to 2.4 percent by weight of the pozzolan material. In cement compositions employing bromide, nitrite, thiocyanate, cyanide or lactate ions these ions should be present in an amount corresponding to equal quantities of chloride ions within the general and preferred ranges set out above. In cement compositions employing combinations of the anions the total amount of these ions should be maintained within the same general and preferred ranges.

A portion of the chloride, bromide, lactate, nitrite, thiocyanate, or cyanide ions may be replaced and supplemented by one or more ions selected from the group consisting of sulfate, thiosulfate, nitrate, sulfite, or silicylate ions. However, these cannot be used to totally replace the chloride, bromide, nitrite, thiocyanate, cyanide, and/or lactate ions in the pozzolan cement compositions of this invention. Preferably the pozzolan cement compositions should always contain sufficient anions, such as those selected from the group consisting of chloride, bromide, nitrite, thiocyanate, cyanide, and/or lactate ions, to constitute at least approximately 0.1 percent by weight, in terms of the equivalent weight of chloride ions, of the pozzolan material. In addition, one or more of the ions in the group consisting of thiosulfate, nitrate, sulfate, sulfite, or salicylate ions may be used in an amount such that the total amount of anions present from both groups, i.e., chloride, bromide, nitrite, thiocyanate, cyanide, lactate, thiosulfate, nitrate, sulfate, sulfite, and salicylate, is present in an amount up to approximately 6.0 percent by weight, in terms of the equivalent weight of chloride ions, of the pozzolan material.

It has been found that the pozzolanic reaction can be accelerated further by adding sufficient quantities of at least one alkali metal ion selected from the group consisting of sodium, potassium, and lithium ions. These ions apparently increase the water solubility of the silicious constituents in the pozzolan material, thereby permitting the silica in solution to react with excess lime liberated by the hydration of the cement.

Any measurable amounts of sodium, potassium and/or lithium ions will have some identifiable effect in catalyzing the pozzolanic reaction and offsetting the reduction in early compressive strength usually associated with high pozzolan content cement compositions. If sodium ions are utilized, the cement composition should contain sodium ions in an amount comprising up to approximately 4.0 percent by weight of the pozzolan material present in the cement composition, and preferably, sufficient sodium ions should be present to constitute from approximately 0.2 to 1.6 percent by weight of the pozzolan material. In cement compositions employing potassium or lithium ions as the alkali ion constituent, the potassium or lithium ions may be present in amounts corresponding to equal quantities of sodium ions within the general and preferred ranges set out above. It is also possible to utilize mixtures of sodium, potassium, and/or lithium ions, with the total quantity of potassium and/or lithium ions again being translated into the equivalent molecular weight of sodium ions. When alkali metal ions are added in amounts in excess of 4.0 percent by weight, in terms of the equivalent weight of sodium ions, of the pozzolan material, the beneficial effects are diminished, and after the water has evaporated from its surface, the exterior of such a cement composition is noticeably discolored by a powdery white residue.

To determine whether or not a pozzolan is classified as self-setting, the reactivity of the pozzolan, as such, must be tested. A mortar is prepared utilizing the particular pozzolan in question by first adding 6 parts of the pozzolan, by weight, to 13 parts of a dry sand. Sufficient water is then added to permit a 1" slump, using a slump test.

The mortar mixture is prepared by adding the pozzolan and water to a mixer of the type described in ASTM Standard C 109. The pozzolan and water are than mixed at a slow speed for 30 seconds, after which the sand is added to the mixer during a 30 second period while continuing to mix at slow speed. Then the mixture is mixed at a medium speed for an additional 30 seconds. The mixer is then turned off for 90 seconds, and during the first 15 seconds, the sides of the mixer bowl are scraped down. The mixture is then mixed for an additional 60 seconds.

During the first 90 seconds after the last mixing, the bowl is removed from the mixer and a fraction of the mixture is tested for slump. The slump is measured utilizing a measuring cone as described in paragraph 2.3 of ASTM Standard C 128-73. Initially one-half of the cone is filled with the test sample and rodded 25 times with a rounded tip rod having a diameter of ¼". The remainder of the metallic cone is then filled and rodded 25 times with the rod passing through the top layer and barely into the second to consolidate the two layers. Following the second rodding, excess material is struck from the top of the cone utilizing the edge of a trowel, and the cone is slowly removed during a ten second interval. The cone is placed beside the conical mass of the test sample material, and the difference between the height of the standard cone (the original height of the sample) and the height of the sample after removal of the cone is then measured as the slump.

When a sufficient water amount has been determined, for the particular pozzolan and sand combination, to give a 1" slump, a fraction of that particular batch is compacted into at least three standard 2-inch cube molds, in the same manner that cubes of concrete mortar mixes are developed for compressive strength tests. The details and procedure to be following in developing these cubes is outlined in ASTM Standard C 109-77.

The cube molds should be filled, and the compaction and striking-off should also be carried out within the first 90 seconds after the last mixing, coextensively with the above described slump test.

The balance of the material from the batch, which has been determined to have a sufficient water amount included as determined by the above described slump test, as well as the material used to make the slump test, is put back into the mixer and mixed at a slow speed for fifteen minutes. The batch material is then again tested for slump by the slump test as described above. A variation of 1/16" in the second slump test is non-indicative of a self-setting pozzolan, however if this second slump test shows greater than 1/16" less slump, there is a better than even possibility that the pozzolan is self-setting. However, ths is not the conclusive test to determine whether or not the self-setting classification should be applied, but merely a relatively good indicator.

Following the fifteen minute second mix cycle, at slow speed, and the second slump test, a fraction of the material that has been so treated is compacted into a second set of at least three standard 2-inch cube molds, in the same manner as described above. If the material is too well set to be susceptible of use to develop acceptable cubes for compressive strength tests, at this point, all of the batch material can be discarded except that which has already been placed in the first setof at least three 2-inch cube molds in conjunction with the first slump test.

Next a series of penetration resistance tests is performed on the material in one of the cube molds from each set of at least three. A test is performed on the material still in the mold, and the resistance is recorded at the end of the first, second, third and fourth hours following the time when the compaction of the batch material into the particular mold is completed. The hour interval period may vary about ±3 minutes. The other two or more developing cubes in each set of cube molds are saved for compressive strength tests, to be taken one day, seven days, and 28 days, as is well known to those skilled in the art, in accordance with ASTM Standard C 109-77.

Penetration resistance is measured by an apparatus called a penetrometer, several different models of which are commercially available on the market. It is preferred that the penetrometer be capable of measuring resistance up to about 700 psi. For purposes of characterizing "full set" of cementitious materials, including self-setting pozzolan materials as well as portland cements, it is considered that a 500 psi or greater penetration resistance is indicative when measured by a penetrometer. An example of an acceptable penetrometer is the model No. H-4200 as manufactured by the Humboldt Manufacturing Company.

A self-setting pozzolan material is defined as one that shows a penetration resistance of 50psi or more in any of the four hour-interval penetration resistance tests, as described above, when the samples are prepared as described above. For purposes of the penetration resistance tests, the size and/or shape of the molds is immaterial, however, the compaction of the material and the striking-off thereof should be adhered to as discussed in ASTM Specification C 109-77. The standard 2-inch cube molds are convenient and this size is required to perform the subsequent standard compressive strength tests (which are not necessary to the determination of a self-setting pozzolan but which may be beneficial in determining which particular self-setting pozzolan is more desirable for a particular application than others). The readings of penetration resistance are recorded to develop a correlation between time of set and resistance to penetration or degree of set. This distinction can be made among the self-setting pozzolans, in regard to speed and degree of set, which may be useful in determining desirability of a particular self-setting pozzolan for particular applications or use.

Once a self-setting pozzolan material is identified, formulation of the test mortar mixes is begun. In the preferred embodiment two examples of self-setting fly ashes were determined. Ash I was generated by the Muskogee Station of the Oklahoma Gas and Electric Company. Ash II was generated by the Gentry Station of the Arkansas Power and Light Company. Both of these ashes are derived from lignite coals, however, tests have indicated that various grades of sub-bituminous and high volatile bituminous coals produce fly ashes which also exhibit self-setting characteristics.

Type I portland cements were utilized in the tests conducted in regard to the preferred embodiment in conformance with ASTM Standard C 150-74. The sand used in these tests was Waugh sand, mined near Montgomery, Alabama, although other tests have indicated that the source of the sand is not material in regard to the results obtained. However, it is considered significant that the sand be dry to the extent of commercial acceptability in the concrete industry.

In the tests related to the preferred embodiment, a commercial grade of rock salt (NaCl) was used, substantially identical to the rock salt used to melt road ice in the northeastern U.S. Also boric acid ($H_3BO_3$) of 95%+ purity was used although other tests have indicated that boric acid of normal commercial purity also work well. The borax used was of commercial purity.

The following are typical examples of the compositions tested in relation to developing the preferred embodiment:

Composition A 100 grams Type I portland cement
475 grams fly ash I
1370 grams Waugh sand
5 grams NaCl (rock salt) 5.5 grams $H_3BO_3$ (boric acid)
222 milliliters $H_2O$ (tap water)

Composition B 100 grams Type I portland cement
660 grams fly ash I
1200 grams Waugh sand
5.0 grams NaCl (rock salt)
1.5 grams $H_3BO_3$ (boric acid)
217 milliliters $H_2O$ (tap water)

Composition C 100 grams Type I portland cement
500 grams fly ash I
1350 grams Waugh sand
5.0 grams NaCl (rock salt)
1.5 grams $H_3BO_3$ (boric acid)
217 milliliters $H_2O$ (tap water)

Composition D 250 grams Type I portland cement 500 grams fly ash I
1200 grams Waugh sand
5.0 grams NaCl (rock salt)
1.5 grams $H_3BO_3$ (boric acid)
227 milliliters $H_2O$ (tap water)

Composition E 100 grams Type I portland cement
500 grams fly ash II
1300 grams Waugh sand
10.0 grams NaCl (rock salt)
1.5 grams $H_3BO_3$ (boric acid)
223 milliliters $H_2O$ (tap water)

It should be noted that the water requirements for all of the mixes tested was set on the basis of the quantity of water necessary to obtain generally about a 1″ slump as determined by the slump test hereinabove described.

The mixing procedure utilized on each test was the basic procedure described in ASTM Standard C-109 with a few modifications. First the fly ash and rock salt were mixed together. Then the portland cement, the rock salt treated fly ash, the boric acid (or borax in some samples) and the water were added to the mixer described in the standard test procedure. The amounts of portland cement, fly ash and sand utilized remained constant for a given series of tests. The ingredients were then mixed at the slow speed for 30 seconds, after which the sand was added to the mixer during a 30 second period while mixing at the slow speed. The whole batch was then mixed at the medium speed for an additional 30 seconds.

The mixer was then turned off for 90 seconds, and during the first 15 seconds, the sides of the mixer were scraped down. The cement composition was then mixed at the medium speed for an additional 60 seconds.

During the first 90 seconds after the final mixing, the bowl was removed from the mixer. Sufficient mortar was removed and measured for slump, the test taking approximately 30 to 45 seconds to perform. Following completion of this test, the batch was returned to the mixing bowl and was mixed for fifteen seconds at the medium speed. The cement composition then was compacted into six standard 2-inch cubes for measurement of compressive strength per ASTM Standards C 192 and C 39. The cubes were cured using lime water under ASTM Standard C 109 conditions. All tests were conducted under standard conditions of temperature and humidity specified in the same ASTM standard.

One of the preferred additives is sodium chloride which may be incorporated into the cement composition in the form of sea water. Sea water is particularly useful, because it contains appreciable amounts of potassium and sulfate ions in addition to sodium chloride. The following is a typical chemical analysis of the ionic constituents of sea water:

| Ion | (ppm) |
| --- | --- |
| Sodium | 10,000 |
| Potassium | 700 |
| Calcium | 440 |
| Magnesium | 1,316 |
| Sulfate | 2,515 |
| Chloride | 20,750 |

The beneficial effect of sea water is particularly surprising, since heretofore it has been generally accepted that sea water is deleterious to cement compositions. The present invention now provides cement composition utilizing sea water, thereby making cement compositions more readily available in areas where sea water is plentiful and fresh water relatively scarce.

It has been found that the benefits of the present invention can be achieved without adding an alkali metal constituent if chloride ion is added in the form of calcium chloride in an amount sufficient to comprise approximately 0.5 to 4.0 percent and preferably from approximately 0.5 to 3.0 percent by weight of the pozzolan material present and the other ingredients of the cement composition are added in accordance with the proportions described herein. These cement compositions may contain alkali metal ions and the anions described above in the amounts previously set forth. However, cement compositions in which chloride ion is added with an alkali metal constituent demonstrate larger early compressive strengths than analogous cement compositions in which the chloride ion is added as calcium chloride.

Another advantage of the present invention is that the benefits of using relatively large amounts of fly ash can be achieved without adding extraneous lime, i.e., lime other than that produced in situ by hydration of the cement. The cement compositions of the present invention may tolerate extraneous lime in amounts up to approximately 4.0 percent by weight of the fly ash, although the setting time of the product is reduced. When additional lime is added in amounts exceeding about 4.0 percent by weight of the pozzolan material, the early strength of the cement composition is diminished. Accordingly, the present cement compositions may contain additional extraneous lime in amounts less than approximately 4.0 percent by weight of the pozzolan material.

It is known that one of the factors which appears in the self-setting pozzolans, but which either does not appear or appears to a significantly lesser degree in the non-self-setting pozzolan, is the presence of one or more alkaline earth oxides, for example, calcium oxide or compounds which are reported as calcium oxides as calculated by ASTM Standard C 114-77. Tests have indicated that the pozzolan materials which have inclusion of compounds reported as calcium oxides per ASTM Standard C 114-77 in the range of about 8% by weight or greater, tend to be much stronger self-setting pozzolans than those which contain a significantly lesser percentage of compounds so reported as calcium oxides. However, it has not been determined that the inclusion of calcium oxide, as such, or for that matter, any of the compounds which are so reported as calcium oxide, is clearly a determinative factor in regard to defining self-setting pozzolan. Rather, the only reliable test appears to be the functional test, described hereinabove, for self-setting pozzolans.

Examples of usable water soluble oxide of boron compounds in addition to boric acid ($H_3BO_3$) and borax ($Na_2B_4O_7.10\ H_2O$) are: $Na_2B_5O_8.5\ H_2O$; $KB_5O_8.4\ H_2O$; $LiB_5O_8.5\ H_2O$; $NaBO_2.4\ H_2O$; and other similar compounds and mixtures. The critical factor is that the weight of the water soluble oxide of boron compounds be equated to the weight of borate ions ($BO_3^=$), and that the equivalent weight be added to the mixture in a range of about 0.01 to 2.0 percent by weight of the pozzolan material. Thus for 500 grams of self-setting fly ash, boric acid should preferably be added in a range of about 0.05 grams to 10 grams within the present invention. The critical factor in developing equivalent weights of water soluble oxide of boron compounds is matching the number of boron atoms per mole. For example, when it is desired to develop the equivalent weight of Borax to be used in place of boric acid, since boric acid, $H_3BO_3$, contains one atom of boron while borax, $Na_2B_4O_7.10\ H_2O$, contains four atoms of boron, four moles of boric acid will be needed for each mole of borax:

1 mole boric acid = 61.83 grams boric acid
4 moles boric acid = 245.32 grams boric acid
1 mole borax = 371.47 grams borax $$\frac{371\ \text{grams borax}}{245.32\ \text{grams boric acid}} = 1.55$$

Therefore, for each gram of boric acid in the mixture, the equivalent replacement amount of borax would be 1.55 grams. Thus the range of borax in a mixture containing 500 grams of self-setting fly ash would be preferably about 0.078 grams to 15.5 grams within the present invention. It should be noted that the above ratio formulation is a rule-of-thumb approach and serves as an approximation. Some minor testing will be required to optimize the replacement amount. For example, where it is desired to replace 5.0 grams of boric acid in a mixture with borax, the above ratio formulation indicates 7.75 grams. However, tests should be conducted in a range of about ±10% or about 7.0 grams to 8.5 grams to determine the optimum amount of borax for that particular mix. It is believed that commercial purities vary, which is why the minor adjustments are required, in view of the fact that the above ratio formulation rule-of-thumb is dealing in theoretical 100% purity levels. If the precise purity levels of both the boric acid used and the proposed borax replacement where known, then calculations could be included to initially adjust the replacement valve precisely.

The tests conducted, as reported hereinafter, measured the set time in hours, from the end of the mixing period to 500 psi penetration resistance, and the compressive strength of the 2"×2" mortar cubes made with each batch in psi. To establish a comparison standard a batch was mixed as follows:
100 grams Type I portland cement
475 grams fly ash I
1370 grams Waugh sand
237 milliliters $H_2O$ (tap water)

The set time was 2.10 hours, the 1 day compressive strength was 430 psi, and the 7 day compressive strength was 750 psi. It should be noted that the comparison standard included no additives.

Next, tests were run to determine the individual effects of certain additives, namely rock salt (NaCl) and Boric Acid ($Na_3BO_3$), all using Type I portland cement, fly ash I, Waugh sand and tap water:

| | Mix No. | | | | | | | |
|---|---|---|---|---|---|---|---|---|
| | 11 | 12 | 13 | 14 | 15 | 16 | 17 | 18 |
| Cement, grams | 100 | 100 | 100 | 100 | 100 | 100 | 100 | 100 |
| Fly ash, grams | 475 | 475 | 475 | 475 | 475 | 475 | 475 | 475 |
| Sand, grams | 1370 | 1370 | 1370 | 1370 | 1370 | 1370 | 1370 | 1370 |
| Water, ml | 229 | 223 | 223 | 230 | 231 | 233 | 227 | 221 |
| Salt, grams | 5 | 10 | — | — | — | — | — | — |
| Boric acid, grams | 0 | 0 | .25 | .5 | 1.0 | 2.5 | 4.0 | 5.5 |
| Slump, 1/16" 5 min | 14 | 14 | 16 | 18 | 13 | 16 | 15 | 14 |
| Set, hours | 1.70 | 1.25 | 2.75 | 3.75 | 3.90 | 3.75 | 3.50 | 5.00+ |
| 1 day strength | 500 | 650 | 380 | 300 | 300 | 350 | 430 | 350 |
| 7 day strength | 2780 | 2780 | 900 | 1250 | 1080 | 930 | 1250 | 1830 |

It should be noted that the 7 day compressive strength show dramatic increases over the comparison standard with no additives but the set time decreases where only rock salt is added. On the other hand, where only boric acid is added, the 7 day compressive strengths show some increase when compared with the comparison standard with no additives, but nowhere near as great as that exhibited with only rock salt additives. However, the addition of boric acid also appears to significantly increase the set time over both the comparison standard and the batches with only rock salt added.

Next, tests were run to determine the combined effects of the additives, rock salt and boric acid, again using Type I portland cement, fly ash I, Waugh sand and tap water:

| | Mix No. | | | | | | |
|---|---|---|---|---|---|---|---|
| | 21 | 22 | 23 | 24 | 25 | 26 | 27 |
| Cement, grams | 100 | 100 | 100 | 100 | 100 | 100 | 100 |
| Fly ash, grams | 475 | 475 | 475 | 475 | 475 | 475 | 475 |
| Sand, grams | 1370 | 1370 | 1370 | 1370 | 1370 | 1370 | 1370 |
| Water, ml | 211 | 221 | 227 | 227 | 227 | 222 | 221 |
| Salt, grams | 5 | 5 | 5 | 5 | 5 | 5 | 5 |
| Boric acid, grams | 0.25 | 0.50 | 1.00 | 2.50 | 4.00 | 5.50 | 7.00 |
| Slump, 1/16" 5 min. | 15 | 22 | 16 | 16 | 15 | 16 | 16 |
| Set, hours | 1.75 | 3.50 | 4.00 | 4.00 | 4.80 | 5.00+ | 5.00+ |
| 1 day strength | 400 | 330 | 500 | 450 | 650 | 400 | 350 |
| 7 day strength | 2800 | 2650 | 3200 | 2850 | 2830 | 2780 | 2600 |

It should be noted that the combination of rock salt and boric acid appears to show some increase in seven day compressive strengths over that of mix nos. 11 and 12 where only rock salt was added, however, the set times are not increased to the same extent of those shown for mix nos. 13–18 when compared with the comparison standard with no additives, but the set times are significantly longer than those of mix nos. 11 and 12 where only rock salt was used. p Next, tests were conducted with different quantities of Type I portland cement, fly ash I and Waugh sand, still using rock salt, boric acid and tap water. A second slump test was made 20 minutes after the commencement of the mixing to determine slump differentials from the initial first slump test made, in all cases, 5 minutes after the commencement of the mixing:

| | Mix. No. | | | |
|---|---|---|---|---|
| | 31 | 32 | 33 | 34 |
| Cement, grams | 250 | 250 | 250 | 250 |
| Fly ash, grams | 500 | 500 | 500 | 500 |
| Sand, grams | 1200 | 1200 | 1200 | 1200 |
| Water, ml | 227 | 227 | 227 | 230 |
| Salt, grams | 5 | 5 | 5 | 5 |
| Boric acid, grams | 0.50 | 1.00 | 1.50 | 2.00 |
| Slump, 1/16" 5 min. | 21 | 19 | 16 | 18 |
| Slump, 1/16" 20 min. | 4 | 9 | 20 | 12 |
| Set, hours | 3.80 | 4.75 | 4.90 | 4.00 |
| 1 day strength | 1150 | 1530 | 1250 | 680 |

-continued

|  | Mix. No. | | | |
|---|---|---|---|---|
|  | 31 | 32 | 33 | 34 |
| 7 day strength | 6800 | 6800 | 7050 | 6900 |

In view of the fact that alternation of the relative quantities of Type I portland cement, fly ash I and Waugh sand appeared to have a significant positive impact on the 1 day and 7 day compressive strength results, more tests were performed with additional variations in these batch elements. The first batch did not include boric acid. The second slump test again was made for each batch 20 minutes after the commencement of the mixing to determine slump differentials from the initial first slump tests made in all cases 5 minutes after the commencement of the mixing:

|  | Mix No. | | | | | | | |
|---|---|---|---|---|---|---|---|---|
|  | 41 | 42 | 43 | 44 | 45 | 51 | 52 | 53 |
| Cement, grams | 100 | 100 | 100 | 100 | 100 | 100 | 100 | 100 |
| Fly ash, grams | 660 | 660 | 660 | 660 | 660 | 500 | 500 | 500 |
| Sand, grams | 1200 | 1200 | 1200 | 1200 | 1200 | 1350 | 1350 | 1350 |
| Water, ml | 217 | 213 | 213 | 217 | 207 | 215 | 217 | 217 |
| Salt, grams | 5 | 5 | 5 | 5 | 5 | 5 | 5 | 5 |
| Boric acid, grams | — | 0.50 | 1.00 | 1.50 | 2.50 | 0.50 | 1.0 | 1.50 |
| Slump, 1/16" 5 min. | 18 | 21 | 17 | 19 | 17 | 21 | 19 | 19 |
| Slump, 1/16" 20 min. | 0 | 10 | 15 | 19 | 12 | 7 | 19 | 18 |
| Set, hours | 0.75 | 2.50 | 3.30 | 3.20 | 2.75 | 2.20 | 3.70 | 3.70 |
| 1 day strength | 680 | 780 | 750 | 750 | 950 | 400 | 450 | 450 |
| 7 day strength | 1550 | 3550 | 4530 | 4250 | 4400 | 1600 | 3100 | 2650 |

In mix nos. 41–45 the relative amounts of Type I portland cement was reduced, of fly ash I was raised, and of Waugh sand was maintained equal in relation to mix nos. 31–34. Mix no. 41 included no boric acid, as mentioned before, in order to test the set time, slump loss differential and compressive strengths, to get some indication in regard to how rock salt alone affects the test results and, by comparison, the significance of boric acid as an additive. When compared with mix nos. 31–34, mix nos. 42–45 indicate a decrease in both 1 day and 7 day compressive strengths as well as a decrease in set time. Note that there does appear to be a correlation between increase in set time, with slump loss differential. The comparison of the test results of mix nos. 42–45 with mix nos. 31–34 appears to indicate that as the fly ash I is increased, with a corresponding decrease in Type I portland cements, that there is a reduction in both set times and in compressive strengths. However, all of the tests to this point have indicated generally that set time is increased as boric acid is added, and in the optimum range, slump loss is decreased.

Next, a set of tests was conducted to verify the hypothesis that borax, as a replacement for boric acid, would also give generally the same results. As before, Type I portland cement, fly ash I, Waugh sand, tap water and rock salt were used:

|  | Mix No. | | |
|---|---|---|---|
|  | 61 | 62 | 63 |
| Cement, grams | 100 | 250 | 250 |
| Fly ash, grams | 500 | 500 | 500 |
| Sand, grams | 1350 | 1200 | 1200 |
| Water, ml | 218 | 217 | 229 |
| Salt, grams | 5 | 5 | 5 |
| Borax, grams | 1.55 | 1.02 | 2.31 |
| Slump, 1/16" 5 min. | 15 | 22 | 18 |
| Slump, 1/16" 20 min. | 18 | 2 | 18 |
| Set, hours | 5.25 | 4.00 | 4.00 |
| 1 day strength | 700 | 1580 | 850 |
| 7 day strength | 4200 | 6650 | 6900 |

Mix no. 61 is equivalent to mix. no. 52 except for the replacement of the boric acid of mix. no. 52 with borax in mix. no. 61. Mix. no. 61 shows significant increases in both set time and compressive strengths when compared with mix no. 52. Mix no. 63 is equivalent to mix no. 33 except for the replacement of the boric acid of mix. no. 33 with borax in mix no. 63. Mix no. 63 shows a slight increase in the 1 day compressive strength over mix no. 33. Otherwise, the set times and 7 day compressive strength results are the same for mix nos. 33 and 63. It is noted that mix no. 52 shows no slump differential between the first and second slump tests while mix no. 61 shows an increase in slump between the first and second test, whereas, if the batch had begun to set, a decrease in slump should have been noted. Mix no. 33 exhibits a similar increase in slump between the first and second slump tests while mix no. 63 shows no slump differential. No explanation is offered herein as to why this increase in slump would occur. On the other hand, the occurrence of no slump differential is believed to be due to no set phenomena having occurred during the first twenty minute period commencing with the initiation of mixing. Mix no. 62 is equivalent to mix. no. 63 except that slightly less than half of the borax is used. Note that although the set times of mix nos. 62 and 63 are identical, the slump decrease of mix no. 62 is drastic compared to mix no. 63. Note also that although the 1 day compressive strength of mix no. 62 is no greater than that of mix no. 63, the 7 day compressive strength of mix no. 62 is less than that of mix no. 63.

Finally, tests were run to indicate the usability of different self-setting pozzolans. In these tests fly ash II was utilized instead of fly ash I, however, again type I portland cement, Waugh sand and tap water were used:

|  | Mix No. | | | | | | | | |
|---|---|---|---|---|---|---|---|---|---|
|  | 71 | 72 | 73 | 74 | 75 | 76 | 77 | 78 | 79 |
| Cement, grams | 100 | 100 | 100 | 100 | 100 | 100 | 100 | 100 | 100 |
| Fly ash, grams | 500 | 500 | 500 | 500 | 500 | 500 | 500 | 500 | 500 |
| Sand, grams | 1300 | 1300 | 1300 | 1300 | 1300 | 1300 | 1300 | 1300 | 1300 |
| Water, ml | 223 | 217 | 209 | 223 | 223 | 223 | 221 | 217 | 209 |
| Salt, grams | 5 | 5 | 5 | 5 | 5 | 5 | 5 | 5 | 5 |
| Boric acid, grams | — | 0.50 | 1.00 | 1.50 | 2.00 | 2.50 | 4.00 | 6.00 | 10.00 |
| Slump, 1/16" 5 min. | 15 | 18 | 18 | 18 | 17 | 18 | 17 | 17 | 17 |
| Slump, 1/16" 20 min. | 0 | 12 | 19 | 14 | 17 | 16 | 15 | 18 | 20 |
| Set, hours | 1.50 | 3.00 | 3.00 | 3.25 | 3.50 | 3.50 | 3.75 | 4.25 | 5.00 |

-continued

| | Mix No. | | | | | | | | |
|---|---|---|---|---|---|---|---|---|---|
| | 71 | 72 | 73 | 74 | 75 | 76 | 77 | 78 | 79 |
| 1 day strength | 900 | 2080 | 2000 | 2450 | 2080 | 1980 | 750 | 730 | 680 |
| 7 day strength | 3880 | 4680 | 5500 | 4850 | 4950 | 4500 | 3250 | 3250 | 2780 |

It appears that the change in self-setting pozzolan produced generally equivalent results to the results produced in the previous tests, mix Nos. 21–27, 31–34, 41–45, 51–53 and 61–63.

All of the above tests except the comparison standard and mix Nos. 11–18 were repeated altering the rock salt to 3 grams and 7 grams and to 10 grams. The results from these repeats were substantially equivalent, respectively, to those shown for mix Nos. 21–27, 31–34, 41–45, 51–53, 61–63 and 71–79.

In commercial application generally, and particularly commercial ready-mix operations, there at least three critical factors: early stiffening characteristics, set time, and compressive strength. Early stiffening characteristics are generally determined by the above described slump tests. Greater early stiffening is illustrated by slump loss between the first and second slump tests. Set time is a function of time, that is, the amount of time required to exhibit significant penetration resistance. Both of these factors are related to the relative workability of concretes. Stiffening characteristics are directly related to the relative degree of workability of a concrete at a job site while set time is directly related to the amount of time available during which the concrete can be worked. High early compressive strength is a desirable characteristic in that it permits subsequent construction to progress on the concrete with a shorter time frame. Early compressive strength characteristics, especially the 7 day compressive strength characteristics, are generally a reliable indicator of the relative degree of ultimate long term compressive strengths, for example, at 28 days, 56 days, etc.

In view of the fact that all of the tests hereinbefore stated were run in laboratory size batches, the question was posed as to whether or not the characteristic test results would be maintained in commercial batch sizes using commercial mixing procedures. The following batch was mixed in a standard drum-type 6 yard capacity ready-mix truck:

| Mix No. 101 | |
|---|---|
| Type I portland cement | 100 lbs. |
| Fly ash I | 500 lbs. |
| Waugh sand | 1300 lbs. |
| 1" washed river gravel | 1895 lbs. |
| Tap water | 230 lbs. (27.6 gallons) |
| Rock salt (NaCl) | 2.6 lbs. |
| Borax ($Na_2B_4O_7 \cdot 10 H_2O$), commercial purity | 2.3 lbs. |

The results appeared consistent with the laboratory size batches mixed previously, and no unanticipated problems became apparent. The mixing time for this batch, mix no. 101, was 5 minutes in the ready mix truck. The slump test sample, taken from the batch as it was poured, was 4". A second slump test sample, taken 15 minutes following the pour, showed a slump of 3".

Set occurred 3.25 hours following the pour. No ASTM Standard C 109-77 compressive strength tests were made due to the difficulty encountered in following the established procedure in developing satisfactory 2" cubes, caused by the inclusion of the 1" washed river gravel into the mix. However, a 7 day compressive strength test was run in accordance with ASTM Standard C 39-72, the results of which showed a 4480 psi. compressive strength.

Another commercial size batch was prepared, using, again, a standard drum-type 6 yard capacity ready-mix truck. Again the batch was mixed for 5 minutes in the truck. This second commercial size batch again used type I portland cement, however, Arkansas River sand was used, and the aggregate was ¾" limestone. Again, fly ash I was used. The batch components were as follows:

| Mix No. 102 | |
|---|---|
| Type I portland cement | 100 lbs. |
| Fly ash I | 500 lbs. |
| Arkansas River sand | 1400 lbs. |
| ¾" limestone | 1780 lbs. |
| Tap water | 209 lbs. (25.1 gallons) |
| Rock salt (NaCl) | 10.0 lbs. |
| Boric acid ($H_3BO_3$) 95% purity | 3.6 lbs. |

A slump test sample, taken from this batch as it was poured, was 3¾". A second slump test sample, taken 15 minutes following the pour, likewise showed a slump of 3¾". Set occurred 3.80 hours following the pour. A 7 day compressive strength test was run in accordance with ASTM Standard C 39-72, the results of which showed a 4320 psi compressive strength. Again, these results appeared consistent with the laboratory size batches mixed previously, and no unanticipated problems became apparent.

According to the provisions of the patent statutes, the principles, the preferred embodiment, and the mode of operation of the present invention have been disclosed and described, along with alternate embodiments thereof. However, it is to be understood that within the scope of the appended claims the present invention may be practiced otherwise than is specifically described in detail.

What is claimed is:

1. A cement composition consisting essentially of a portland cement, at least one self-setting pozzolan material, a fine aggregate, air, water, at least one alkali metal constituent selected from the group consisting of sodium, potassium and lithium ions, at least one anionic constituent, selected from the group consisting of chloride, bromide, nitrite, thiocyanate, cyanate and lactate, which is soluble in water and forms a calcium salt which is also soluble in water, and at least one water soluble oxide of boron compound, wherein:
(a) said alkali metal constituent is present in an amount up to approximately 4.0 percent by weight, in terms of the equivalent weight of said sodium ions, of said self-setting pozzolan material;
(b) said anionic constituent is present in an amount up to approximately 6.0 percent by weight, in terms of the equivalent weight of chloride ions, of said self-setting pozzolan material;

(c) said water soluble oxide of boron compound is present in the range of about 0.01 to 2.0 percent by weight, in terms of the equivalent weight of boron ions, of said self-setting pozzolan material; and said cement composition being further characterized by;

(d) having a solid volume ratio of said portland cement to said self-setting pozzolan material within a range of approximately 0.05 to 2.0;

(e) having a ratio of the volume of a paste, comprising said self-setting pozzolan material, said portland cement, said air and said water, to the solid volume of said fine aggregate within the range of approximately 0.75 to 2.5; and (f) having a ratio of the solid volume of said portland cement to the volume of said cement composition of less than about 0.19.

2. The cement composition of claim 1 wherein said self-setting pozzolan material comprises at least one self-setting fly ash.

3. The cement composition of claim 1 wherein said fine aggregate comprises sand.

4. The cement composition of claim 1 further comprising a coarse aggregate.

5. The cement composition of claim 1 wherein said portland cement comprises one of the group consisting of Types I, Ia, II and III portland cements as described in ASTM Standard C 150-74.

6. The cement composition of claim 1 wherein said water soluble oxide of boron compound comprises boric acid.

7. The cement composition of claim 1 wherein said water soluble oxide of boron compound comprises borax.

8. The cement composition of claim 1 wherein said alkali metal constituent is sodium and said anionic constituent is chloride.

9. The cement composition of claim 2 wherein said water soluble oxide of boron compound comprises boric acid.

10. The cement composition of claim 2 wherein said water soluble oxide of boron compound comprises borax.

11. The cement composition of claim 2 wherein said alkali metal constituent is sodium and said anionic constituent is chloride.

12. The cement composition of claim 9 wherein said alkali metal constituent is sodium and said anionic constituent is chloride.

13. The cement composition of claim 10 wherein said alkali metal constituent is sodium and said anionic constituent is chloride.

14. The cement composition of claim 1 further comprising at least one additional ion selected from the group consisting of thiosulfate, sulfate, sulfite, nitrate and salicyclate anions and wherein the total amount of said additional ions and said anionic constituents constitute up to approximately 6.0 percent by weight, in terms of the equivalent weight of chloride ions, of the pozzolan material.

15. The cement composition of claim 14 wherein said self-setting pozzolan material comprises at least one self-setting fly ash.

16. The cement composition of claim 15 wherein said alkali metal constituent is sodium and said anionic constituent is chloride.

17. The cement composition of claim 16 wherein said water soluble oxide of boron compound comprises borax.

18. The cement composition of claim 16 wherein said water soluble oxide of boron compound comprises boric acid.

19. The cement composition of claim 6 wherein said fine aggregate comprises sand.

20. The cement composition of claim 7 wherein said fine aggregate comprises sand.

21. The cement composition of claim 8 wherein said fine aggregate comprises sand.

22. The cement composition of claim 9 wherein said fine aggregate comprises sand.

23. The cement composition of claim 10 wherein said fine aggregate comprises sand.

24. The cement composition of claim 8 wherein said water soluble oxide of boron compound comprises borax.

25. The cement composition of claim 8 wherein said water soluble oxide of boron compound comprises boric acid.

26. The cement composition of claim 24 wherein said fine aggregate comprises sand.

27. The cement composition of claim 25 wherein said fine aggregate comprises sand.

28. The cement composition of claim 26 further comprising a coarse aggregate.

29. The cement composition of claim 27 further comprising a coarse aggregate.

30. A cement composition consisting essentially of a portland cement, at least one self-setting fly ash, sand, air, water, sodium chloride, and at least one water soluble oxide boron compound, wherein:

(a) said sodium chloride is present in an amount up to approximately 10.0 percent by weight of said self-setting fly ash;

(b) said water soluble oxide of boron compound is present in the range of about 0.01 to 2.0 percent by weight, in terms of the equivalent weight of boron ions, of said self-setting fly ash;

(c) having a solid volume ratio of said portland cement to said self-setting fly ash within a range of approximately 0.05 to 2.0;

(d) having a ratio of the volume of a paste, comprising said self-setting fly ash, said portland cement, said air, said water and said sodium chloride, to the solid volume of said sand within the range of approximately 0.75 to 2.5; and (e) having a ratio of the solid volume of said portland cement to the volume of said cement composition of less than about 0.19.

31. The cement compositions of claim 30 wherein said water soluble oxide of boron compound comprises boric acid.

32. The cement composition of claim 30 wherein said water soluble oxide of boron compound comprises borax.

33. The cement composition of claim 30 further comprising coarse aggregate.

34. The cement composition of claim 31 further comprising coarse aggregate.

35. The cement composition of claim 32 further comprising coarse aggregate.

36. The cement composition of claim 30 wherein the sodium chloride is introduced in the form of rock salt.

37. The cement composition of claim 30 wherein said sodium chloride is present in the range of about 0.5 to 2.0 percent by weight of said self-setting fly ash.

38. The cement composition of claim 31 wherein said sodium chloride is present in the range of about 0.5 to 2.0 percent by weight of said self-setting fly ash.

39. The cement composition of claim 32 wherein said sodium chloride is present in the range of about 0.5 to 2.0 percent by weight of said self-setting fly ash.

40. The cement composition of claim 37 wherein said sodium chloride is introduced in the form of rock salt.

41. The cement composition of claim 37 further comprising coarse aggregate.

42. The cement composition of claim 38 further comprising coarse aggregate.

43. The cement composition of claim 39 further comprising coarse aggregate.

44. A cement composition consisting essentially of a portland cement, at least one self-setting fly ash, sand, air, water, calcium chloride and at least one water soluble oxide of boron compound, wherein:
   (a) said calcium chloride is present in the range of about 0.5 to 4.0 percent by weight of said self-setting fly ash;
   (b) said water soluble oxide of boron compound is present in the range of about 0.01 to 2.0 percent by weight, on terms of the equivalent weight of boron ions, of said self-setting fly ash;
   (c) having a solid volume ratio of said portland cement to said self-setting fly ash within a range of approximately 0.05 to 2.0;
   (d) having a ratio of the volume of a paste, comprising said self-setting fly ash, said portland cement, said air, said water and said calcium chloride, to the solid volume of said sand within the range of approximately 0.75 to 2.5; and
   (e) having a ratio of the solid volume of said portland cement to the volume of said cement composition of less than about 0.19.

45. The cement composition of claim 44 wherein said water soluble oxide of boron compound comprises boric acid.

46. The cement composition of claim 44 wherein said water soluble oxide of boron compound comprises borax.

47. The cement composition of claim 44 further comprising coarse aggregate.

48. The cement composition of claim 45 further comprising coarse aggregate.

49. The cement composition of claim 46 further comprising coarse aggregate.

* * * * *